United States Patent [19]

Mitulla et al.

[11] Patent Number: 4,605,699

[45] Date of Patent: Aug. 12, 1986

[54] THERMOPLASTIC MOLDING COMPOSITIONS CONTAINING POLYCARBONATE AND AN ACRYLATE GRAFT COPOLYMER

[75] Inventors: Konrad Mitulla, Ludwigshafen; Juergen Hambrecht, Heidelberg; Adolf Echte; Johann Swoboda, both of Ludwigshafen; Peter Siebel, Limburgerhof; Josef Schwaab, Maikammer; Herbert Frank, Weisenheim, all of Fed. Rep. of Germany

[73] Assignee: BASF Aktiengesellschaft, Ludwigshafen, Fed. Rep. of Germany

[21] Appl. No.: 722,155

[22] Filed: Apr. 11, 1985

[30] Foreign Application Priority Data

Apr. 14, 1984 [DE] Fed. Rep. of Germany ....... 3414118

[51] Int. Cl.[4] .............................................. C08L 69/00

[52] U.S. Cl. ....................................... 525/67; 525/71; 525/902

[58] Field of Search ................... 525/67, 71, 902, 148, 525/468

[56] References Cited

U.S. PATENT DOCUMENTS

| | | | |
|---|---|---|---|
| 3,130,177 | 4/1964 | Grabowski et al. | 260/45.5 |
| 3,655,824 | 4/1972 | Kato et al. | 260/873 |
| 3,891,719 | 6/1975 | Schirmer et al. | 260/873 |
| 4,461,868 | 7/1984 | Lindner et al. | 525/67 |
| 4,504,624 | 3/1985 | Heuschen et al. | 525/67 |

FOREIGN PATENT DOCUMENTS

| | | |
|---|---|---|
| 0111260 | 12/1983 | European Pat. Off. . |
| 3149358 | 12/1981 | Fed. Rep. of Germany . |
| 1253226 | 11/1971 | United Kingdom . |

*Primary Examiner*—Theodore E. Pertilla
*Attorney, Agent, or Firm*—Keil & Weinkauf

[57] ABSTRACT

A thermoplastic molding material consists of from 10 to 90 parts by weight of a polycarbonate A and from 90 to 10 parts by weight of a graft copolymer B having a mean particle size of from 200 to 700 nm ($d_{50}$ value of the integral mass distribution). The graft polymer B is formed from an elastomer (rubber) ($b_1$), which accounts for from 10 to 80% by weight, and a grafted shell ($b_2$), which accounts for from 90 to 20% by weight, the percentages in each case being based on (B).

The elastomer ($b_1$) is composed of from 50 to 99.9% by weight of an alkyl acrylate, where alkyl is of 1 to 8 carbon atoms, and from 0.1 to 5% by weight of a copolymerizable polyfunctional crosslinking monomer.

The grafted shell ($b_2$) is produced in three stages and contains, as graft monomers, ($b_2a_1$) from 5 to 40% by weight of a monoethylenically unsaturated aromatic hydrocarbon of not more than 12 carbon atoms,
in the first stage, ($b_2a_2$) from 15 to 50% by weight of a mixture of a monoethylenically unsaturated aromatic hydrocarbon of not more than 12 carbon atoms and a copolymerizable ethylenically unsaturated monomer, in a weight ratio of from 90:10 to 60:40,
in the second stage, and ($b_2a_3$) from 10 to 85% by weight of an alkyl (meth)acrylate
in the third stage, the percentages in each case being based on ($b_2$).

9 Claims, No Drawings

THERMOPLASTIC MOLDING COMPOSITIONS CONTAINING POLYCARBONATE AND AN ACRYLATE GRAFT COPOLYMER

The present invention relates to thermoplastic molding materials based on polycarbonates and polymers which contain styrene and acrylonitrile and have been toughened with acrylates.

The relevant prior art includes:

(1) U.S. Pat. No. 3,130,177,
(2) British Pat. No. 1,253,266,
(3) German Published Appliation DAS No. 2,037,419,
(4) German Pat. No. 2,259,564,
(5) German Laid-Open Application DOS No. 3,149,358,
(6) German Laid-Open Application DOS No. 3,210,284 and
(7) German Patent Application P No. 32 45 292.5.

Blends of toughened polymers containing styrene and acrylonitrile with polycarbonates are described in (1) and (2). In general, these conventional molding materials possess satisfactory properties. Frequently, however, greater toughness, higher heat distortion resistance and, in particular, improved weather resistance are desirable. Hence, (3), (4) and (6) describe molding materials which are composed of polycarbonates and ASA polymers, in order to obtain improved stability to light and heat. The 2-stage grafting of ASA polymers is described in (5). Finally, (7) describes a blend of polycarbonates and ASA, the grafted shell of the copolymer being produced by a 2-stage procedure. In the case of these molding materials, the toughness and heat distortion resistance frequently do not meet the constantly increasing requirements; in particular, however, the processability and their multiaxial impact strength are completely unsatisfactory.

It is an object of the present invention to provide molding materials which are based on polymer blends consisting of polycarbonates and acrylate graft copolymers and do not have these disadvantages. In particular, it is intended to improve the processing behavior during injection molding and to increase the resistance to multiaxial impact loads in the drop test according to DIN No. 53,443.

We have found that this object is achieved by the molding material described in claim 1.

The present invention therefore relates to a thermoplastic molding material containing (A) from 10 to 90 parts by weight of one or more polycarbonates and (B) from 90 to 10 parts by weight of one or more graft copolymers which are composed of ($b_1$) one or more elastomers (rubbers) which account for from 10 to 80% by weight, based on (B) and consist of ($b_1a_1$) from 50 to 99.9% by weight, based on ($b_1$), of one or more alkyl acrylates where alkyl is of 1 to 8 carbon atoms, ($b_1a_2$) from 0 to 50% by weight, based on ($b_1$), of one or more copolymerizable unsaturated monomers and ($b_1a_3$) from 0.1 to 5% by weight, based on ($b_1$), of a copolymerizable polyfunctional crosslinking monomer and ($b_2$) a grafted shell on this elastomer, which shell accounts for from 90 to 20% by weight, based on (B), wherein the grafted shell ($b_2$) of the copolymer B is produced in three stages and contains, as copolymerized units, ($b_2a_1$) from 5 to 40% by weight, based on ($b_2$), of one or more monoethylenically unsaturated aromatic hydrocarbons of not more than 12 carbon atoms as graft monomers of the first stage, ($b_2a_2$) from 15 to 50% by weight, based on ($b_2$), of a mixture of one or more monoethylenically unsaturated aromatic hydrocarbons of not more than 12 carbon atoms with one or more ethylenically unsaturated monomers which are copolymerizable with this, in a weight ratio of from 90:10 to 60:40, as graft monomers of the second stage, and ($b_2a_3$) from 10 to 85% by weight, based on ($b_2$), of an alkyl methacrylate or an alkyl acrylate where alkyl is of 1 to 8 carbon atoms, or a mixture of these, as graft monomers of the third stage, the graft copolymer formed from the elastomer ($b_1$) and the grafted shell ($b_2$) having a mean particle size of from 200 to 700 nm ($d_{50}$ value of the integral mass distribution).

The composition of the molding material in terms of components (A) to (C) is described below.

The novel molding material contains the components (A) and (B) each in an amount of from 10 to 90, preferably from 30 to 90, % by weight, based on the molding material consisting of A and B, the amounts of the two components summing to 100. Preferably, the molding material consists of the components (A) and (B) in the stated amounts.

The molding material may furthermore contain conventional additives (C), which are used in the usual amounts, preferably in amounts of from 0.1 to 30% by weight, based on the molding material consisting of A and B.

Component (B) of the molding material contains one or more graft copolymers which consist of one or more elastomers ($b_1$) in an amount of from 10 to 80, preferably from 30 to 70, in particular from 40 to 65, % by weight, based on (B).

The graft copolymer furthermore contains one or more grafted shells ($b_2$) in an amount of from 90 to 20, preferalby from 70 to 30, in particular from 60 to 35, % by weight, based on (B). Preferably, the graft copolymer consists of ($b_1$) and ($b_2$) ($\Sigma=100$).

COMPONENT (A)

In the context of the novel molding material, polycarbonates (A) are those based on homopolycarbonates and copolycarbonates. Examples of suitable bisphenols in this context are dihydroxydiphenyls, bis-(hydroxyphenyl)-alkanes and bis-(hydroxyphenyl) ethers. However, all other bisphenols which are suitable for the preparation of polycarbonates can be used, such as those described in, inter alia, the monograph by H. Schnell entitled Chemistry and Physics of Polycarbonates, Interscience Publishers, New York, 1964, U.S. Pat. No. 2,999,835 and German Laid-Open Application DOS No. 2,248,817. Particularly preferred polycarbonates are those based on 2,2-bis-(4-hydroxyphenyl)-propane. The synthesis of the polycarbonates is described, for example, in U.S. Pat. No. 2,999,835 and British Pat. No. 772,627. Component A has a relative viscosity $\eta_{spec}/c$ of from 1.1 to 1.5 [ml/g], corresponding to a mean molecular weight $\overline{M}\eta$ of from 25,000 to 200,000.

COMPONENT (B)

Component (B) comprises one or more graft copolymers (soft component); it is built up from a total of 2 parts, or consists of these.

These are:

($b_1$) an elastomer (rubber) which is present in an amount of from 10 to 80, preferably from 30 to 70, in particular from 40 to 65, % by weight, based on (B), and has a glass transition temperature of less than 0° C., preferably less than −30° C., and ($b_2$) a shell which is grafted onto the elastomer by successive polymerization in 3 steps and accounts for from 20 to 90, preferably from 30 to 70, in particular from 60 to 35, % by weight, based on (B).

Suitable monomers for the preparation of the elastomer are the following, the sum ($b_1a_1$)+($b_1a_2$)+($b_1a_3$) being 100:

($b_1a_1$) from 50 to 99.9, preferably from 70 to 99, in particular from 95 to 99.9, % by weight, based on ($b_1$), of one or more alkyl acrylates where alkyl is of 1 to 8 carbon atoms; preferably, n-butyl acrylate and/or 2-ethylhexyl acrylate are incorporated as copolymerized units.

($b_1a_2$) If required, the elastomeric polymer ($b_1$) may furthermore contain as much as 50, in particular from 10 to 20, % by weight, based on ($b_1$), of a further copolymerizable monomer, such as butadiene, isoprene, styrene, acrylonitrile or vinyl methyl ether, or a mixture of these, as copolymerized units.

($b_1a_3$) In order to obtain crosslinked acrylate polymers, the polymerization of the acrylates is carried out in the presence of from 0.1 to 5, preferably from 1 to 4, % by weight, based on the total amount of monomers used in the preparation of the grafting base, of a copolymerizable polyfunctional, preferably bifunctional monomer ($b_1a_3$) which effects crosslinking. Suitable bi- or polyfunctional crosslinking monomers ($b_1a_3$) of this type are monomers which preferably contain two or more copolymerizable ethylenic double bonds which are not conjugated in the 1,3-positions. Examples of suitable crosslinking monomers are divinylbenzene, diallyl maleate, diallyl fumarate and diallyl phthalate. Tricyclodecenyl acrylate has proven a particularly advantageous crosslinking monomer (cf. German Pat. No. 1,260,135).

Particularly preferred elastomers ($b_1$) are those which contain only the monomers ($b_1a_1$) and ($b_1a_3$) copolymerized in the amounts stated above.

The elastomer ($b_1$) is therefore preferably a crosslinked homopolymer or a copolymer of acrylates, or consists thereof.

The preparation of the soft component ($b_1+b_2$) employed is known per se, and can be carried out by, for example, the method described in German Pat. No. 1,260,135.

Preparation of the Elastomer ($b_1$)

The elastomer, the grafting base ($b_1$), is prepared by polymerizing the acrylate or acrylates ($b_1a_2$) and the polyfunctional monomer ($b_1a_3$) which effects crosslinking, if appropriate together with the further comonomers ($b_1a_2$), in aqueous emulsion, in a conventional manner, at from 20° to 100° C., preferably from 50° to 80° C. The conventional emulsifiers, such as alkali metal salts of alkyl- or alkylarylsulfonic acids, alkyl sulfates, fatty alcohol sulfonates, salts of higher fatty acids of 10 to 30 carbon atoms or resin soaps, can be used. Preferably, the sodium salts of alkylsulfonates or fatty acids of 10 to 18 carbon atoms are used. It is advantageous to employ the emulsifiers in an amount of from 0.5 to 5, in particular from 1 to 2, % by weight, based on the monomers used in the preparation of the grafting base ($b_1$). In general, the ratio of water to monomers is from 2:1 to 0.7:1. The polymerization initiators used are, in particular, the conventional persulfates, such as potassium persulfate, but is is also possible to employ redox systems. The initiators are used in general in amounts of from 0.1 to 1% by weight, based on the monomers used in the preparation of the grafting base ($b_1$). Other polymerization assistants which can be used in the polymerization are the conventional buffer substances, by means of which the pH is brought to, preferably, 6–9 (e.g. sodium bicarbonate and sodium pyrophosphate), and from 0 to 3% by weight of a molecular weight regulator, such as a mercaptan, a terpinol or dimeric α-methylstyrene.

The exact polymerization conditions, in particular the type, rate of metering and amount of the emulsifier, are determined specifically within the above ranges so that the resulting latex of the crosslinked acrylate polymer has a $d_{50}$ value of about 200–700 nm, preferably 250–600 nm. The particle size distribution of the latex should preferably be narrow. The quotient $Q=(d_{90}-d_{10})/d_{50}$ should be less than 0.5, preferably less than 0.35.

Preparation of the Grafted Shell ($b_2$)

The grafted shell, component ($b_2$), is prepared in a total of 3 successive stages, in which the monomers ($b_2a_1$), then ($b_2a_2$) and finally ($b_2a_3$) are grafted onto the elastomer in the stated sequence. The sum of the copolymerized monomers ($b_2a_1$)+($b_2a_2$)+($b_2a_3$) is 100. The 1st stage accounts for from 5 to 40, preferably from 10 to 25, % by weight, based on ($b_2$). It is prepared using only ethylenically unsaturated aromatic hydrocarbons of not more than 12 carbon atoms ($b_2a_1$).

The 2nd stage of the grafted shell accounts for from 15 to 50, in particular from 20 to 45, % by weight, based on ($b_2$). It is prepared using mixtures of the stated aromatic hydrocarbons ($b_2a_1$) and ethylenically unsaturated monomers ($b_2a_2$) in a weight ratio ($b_2a_1$)/($b_2a_2$) of from 90:10 to 60:40, in particular from 80:20 to 70:20.

The third stage of the grafted shell accounts for from 10 to 85, preferably from 25 to 80, % by weight, based on ($b_2$). It is prepared by incorporating, as copolymerized units, one or more monomers ($b_2a_3$) from the group consisting of the alkyl methacrylates or of the alkyl acrylates, where alkyl in each case is of 1 to 8 carbon atoms.

For the preparation of the grafted shell ($b_2$), and hence of the soft component ($b_1+b_2$), first one or more vinylaromatic monomers ($b_2a_1$) of not more than 12 carbon atoms are incorporated as copolymerized units, or grafted on, in the presence of the latex of the crosslinked acrylate polymer ($b_1$). Examples of such monomers are styrene, α-methylstyrene, and styrenes which are alkylated in the nucleus, such as p-methylstyrene and tert.-butylstyrene. Styrene, α-methylstyrene and p-methylstyrene are particularly preferably used. It is advantageous if this graft copolymerization of, for example, syrene ($b_2a_1$) onto the crosslinked polyacrylate polymer ($b_1$) serving as the grafting base is carried out in aqueous emulsion under the usual conditions, stated above, until the monomers ($b_2a_1$) have been virtually completely consumed. The graft copolymerization can advantageously be carried out in the same system as the emulsion polymerization for the preparation of the grafting base ($b_1$), further emulsifier and initiator being added if necessary. The vinylaromatic monomers to be grafted on, in particular styrene, can be added to the reaction mixture all at once, batchwise in several stages, or, preferably, continuously during the polymerization. The graft copolymerization of the styrene in the presence of the crosslinked acrylate polymer is effected in such a manner that the resulting graft copolymer ($b_1+b_2a_1$) has a degree of grafting of from 5 to 40, preferably from 10 to 25.

In a second stage of the process, the graft coplymerization is then carried out using a monomer mixture of a vinylaromatic monomer and a copolymerizable polar monomer ($b_2a_2$), once again until virtually complete conversion is achieved. The monomers already employed in the first grafting stage, in particular styrene, α-methylstryene and p-methylstyrene, are preferably used in this stage. Examples of copolymerizable, ethylenically unsaturated monomers are acrylonitrile, acrylamide and/or vinyl methyl ether, the first-mentioned being particularly preferred. Particularly preferably used monomer mixtures are styrene and acrylonitrile, α-methylstyrene and/or styrene and acrylonitrile. The second step of the graft copolymerization, too, is advantageously carried out in the same emulsion system; if necessary, further emulsifier and initiator can be added. The monomer mixture to be grafted on, which is preferably a mixture of styrene and acrylonitrile, can be added to the reaction mixture all at once, batchwise in several stages, or, preferably, continuously during the polymerization. The graft copolymerization of the mixture of styrene and acrylonitrile is effected in the presence of the crosslinked acrylate polymer in such a manner that the resulting graft copolymer ($b_1+b_2a_1+b_2a_2$) has a degree of grafting of from 15 to 50, preferably from 20 to 45.

In the 3rd stage of the process, the monomers ($b_2a_3$) are incorporated as copolymerized units, or grafted on, preferably using the emulsifier and initiator system which was employed in the preceding stage of the process. Preferably, esters of methacrylic acid, such as methyl methacrylate, ethyl methacrylate or tert.-butyl methacrylate, are used, the first-mentioned compound being particularly preferred.

The process measures correspond in general to the conditions of the 1st and 2nd stages of the process, except that the degree of grafting is brought to 5–40, preferably 10–30.

For the purposes of the present invention, the degree of grafting is the ratio of the graft monomers to the graft copolymer, i.e.

$$\frac{b_2}{b_1 + b_2} \cdot 100,$$

for example, $$\frac{b_2a_1}{b_1 + b_2a_1} \cdot 100$$

for the 1st stage, $$\frac{b_2a_2}{b_1 + b_2a_1 + b_2a_2} \cdot 100$$

for the second 2nd stage, etc.

It should be noted that, particularly in the case of a layer structure, the degree of grafting can be determined (set) only during the preparation of the graft copolymer.

The graft copolymers ($b_1+b_2$) have mean particle sizes of from 200 to 700 nm ($d_{50}$ value). The conditions during the preparation of the elastomer ($b_1$) should therefore be chosen so that particle sizes in this range result. Measures to this end are known, and are described in, for example, German Pat. No. 1,260,135, German Laid-Open Application DOS No. 2,826,925, and J. Appl. Polym. Sci. 9 (1965), 2929–2938. The size of the particles of the elastomer latex can be increased by, for example, agglomeration.

Soft component B also includes the free, ungrafted homo- and copolymers which contain ($b_2a_1$), ($b_2a_2$) and ($b_2a_3$) and are formed in the graft copolymerization for the preparation of component ($b_2$). Depending on the conditions chosen in the graft copolymerization for the preparation of the graft copolymer ($b_1+b_2$), it may be possible for a small amount of such (co)polymers to be formed during the graft copolymerization. For certain purposes, however, copolymers of the type formed in the graft compolymerization can be added to the novel molding material, in addition to the components A and B, i.e. dilution of the hard matrix A of the novel molding material can be carried out by the skilled worker, using suitable compatible copolymers, without any inventive measures.

COMPONENT (C)

The molding materials according to the invention can contain additives as further components. Examples of such additives are fillers, dyes, pigments, antistatic agents, antioxidants, flameproofing agents and lubricants. The additives are used in the usual amounts, preferably in amounts of from 0.1 to a total of about 30% by weight, based on the molding material consisting of A and B.

Preparation of the Molding Material

Mixing of the components (A), (B) and, where relevant, (C) of the novel molding material can be carried out by any conventional method, but is preferably effected by extruding or kneading the components together or mixing them in a roll mill, if necessary the components being isolated beforehand from the solution obtained in the polymerization, or from the aqueous dispersion. The graft copolymerization products [component (B)] obtained in aqueous dispersion can, however, also be partially dewatered or mixed directly, in the form of a dispersion, with the polycarbonate (A) and the component (C), complete drying of the graft copolymer being effected during the mixing porcess in this case.

The molding materials according to the invention can be prepared, for example, by thoroughly mixing a melt of the polycarbonate [component (A)] with the graft copolymer ($b_1+b_2$) at above 200° C., by throughly mixing a melt of the polymers (A) with a precipitated graft copolymer ($b_1+b_2$), which has a residual water content of from 10 to 40% by weight, at above 180° C., or by thoroughly mixing the melt with a dispersion of the graft rubber ($b_1+b_2$), which has a solids content of from 40 to 70% by weight, at above 180° C.

The novel molding material can be processed by the conventional thermoplastic methods, e.g. by extrusion, injection molding, calendering, blow molding, pressing or sintering; particularly preferably, the molding materials prepared by the novel process are injection molded to produce moldings for automotive construction.

We have found, surprisingly, that the novel molding material possesses not only good processing properties but also excellent notched impact strengths and high resistance to multiaxial impact loads (drop test).

We have furthermore found that the impact strength remains at a high final level after weathering and, in spite of weather damage, the molding materials do not exhibit any fracture after the weathering process.

The parameters described in the present application were determined as follows:

1. The mean particle size and the particle size distribution were determined from the integral mass distribution. In every case, the means particle size is the weight average of the particle sizes, as determined by means of an analytical ultracentrifuge using the method due to W. Scholtan and H. Lange, Kolloid-Z and Z.-Polymere 250 (1972) 82-796. The ultracentrifuge measurement gives the integral mass distribution of the particle diameter of a sample. This provides information as to the percent by weight of the particles which have a diameter equal to or smaller than a particular size. The mean particle diameter, which is also referred to as the $d_{50}$ value of the integral mass distribution, is defined as the particle diameter for which 50% by weight of the particles have a diameter smaller than that corresponding to the $d_{50}$ value. 50% by weight of the particles then accordingly have a diameter larger than the $d_{50}$ value. To characterize the width of the particle size distribution of the rubber particles, the $d_{10}$ and $d_{90}$ values, which are obtained from the integral mass distribution, are employed in addition to the $d_{50}$ value (mean particle diameter). The $d_{10}$ or $d_{90}$ value of the integral mass distribution is defined similarly to the $d_{50}$ value, except that it is based on 10 or 90% by weight, respectively, of the particles. The quotient $$\frac{d_{90}-d_{10}}{d_{50}}=Q$$

is a measure of the width of the particle size distribution.
2. The notched impact strength $a_k$ (in kJ/m$^2$) of the products according to the invention and of comparative samples was measured according to DIN No. 53,453, at 23° C., on standard small bars injection molded at 250° C. The values obtained are summarized in the Table.
3. The multiaxial impact loaded was determined with the aid of the Plastechon test according to DIN No. 53,443, at 23° C., on circular disks injection molded at 250° C.
4. The molecular weight of the polycarbonates was determined by measuring the relative viscosity in a 0.5% strength solution in methylene chloride at 23° C.

To carry out the experiments described in the Examples, and comparative experiments, the products described below were prepared.

1. Preparation of an Elastomer $b_1$ 16 parts of butyl acrylate and 0.4 part of tricyclodecenyl acrylate in 150 parts of water were heated at 60° C., while stirring, 0.5 part of the sodium salt of a $C_{12}$-$C_{18}$-paraffin-sulfonic acid, 0.3 part of potassium persulfate, 0.3 part of sodium bicarbonate and 0.15 part of sodium pyrophosphate being added. 10 minutes after initiation of the polymerization reaction, a mixture of 82 parts of butyl acrylate and 1.6 parts of tricyclodecenyl acrylate was added in the course of 3 hours. When the addition of the monomers was complete, the reaction was allowed to continue for a further hour. The resulting latex of the crosslinked butyl acrylate polymer had a solids content of 40% by weight. This latex was used as nuclei for the subsequent polymerization.

2.5 parts of the latex prepared were initially taken, 100 parts of water and 0.2 part of potassium persulfate were added, and then a mixture of 98 parts of butyl acrylate and 2 parts of tricyclodecenyl acrylate, on the one hand, and a solution of 0.5 part of the sodium salt of a $C_{12}$-$C_{18}$-paraffin-sulfonic acid in 50 parts of water, on the other hand, were run in at 60° C. in the course of 3 hours. When the addition was complete, polymerization was continued for 2 hours. The resulting latex of the crosslinked butyl acrylate polymer had a solids content of 40%, and its mean particle size (weight average) was determined as 465 nm. The particle size distribution was narrow (Q=0.2).

2. Preparation of a Graft Rubber, Component $b_1+b_2$ with 3-stage Grafted Shell 125 parts of the polybutyl acrylate latex obtained were mixed with 10 parts of styrene and 60 parts of water, a further 0.03 part of potassium persulfate and 0.05 part of lauroyl peroxide were added, and the stirred mixture was then heated at 65° C. for 1 hour, after which virtually all the styrene had been consumed. When the first stage of the graft copolymerization was complete, the graft copolymer had a degree of grafting of 17. This graft copolymer dispersion without further additives was polymerized with 20 parts of a 75:25 mixture of styrene and acrylonitrile until virtually all of the monomers had been consumed; this took a further 2 hours. The degree of grafting of the graft copolymer was then 37. Finally, 20 parts of methyl methacrylate were added, and polymerization was continued under the stated conditions until the monomers had been completely converted; this took 2 hours. The 3rd stage of the process gave a degree of grafting of 50. The ratio $b_1/b_2$ for component B was 1:1, based on all 3 stages of the process. The resulting graft copolymer was precipitated from the dispersion by means of calcium chloride solution at 95° C., washed with water and dried in a stream of warm air. The mean particle size (weight average) was determined as 485 nm. The particle size distribution was narrow (quotient Q=0.29).

3. Preparation of a Graft Copolymer with a 2-stage Shell

(Comparative Experiment)

150 parts of the polybutyl acrylate latex obtained were mixed with 20 parts of styrene and 60 parts of water, a further 0.03 part of potassium persulfate and 0.05 part of lauroyl peroxide were added, and the stirred mixture was then heated at 65° C. for 3 hours. When the first stage of the graft copolymerization was complete, the graft copolymer had a degree of grafting of 25. This graft copolymer dispersion, without further additives, was polymerized with 20 parts of a 75:25 mixture of styrene and acrylonitrile for a further 3 hours. When the graft copolymerization was complete, the product was precipitated from the dispersion by means of a calcium chloride solution at 95° C., washed with water and dried in a stream of warm air. The degree of grafting of the graft copolymer was 35. 4. A polycarbonate based on 2,2-bis-(4-hydroxyphenyl)-propane and having a relative viscosity of 1.30 [ml/g], measured on a 0.5% strength solution in methylene chloride, was employed as component (A).

The Examples and comparative experiments which follow illustrate the invention. Parts and percentages are by weight, unless stated otherwise.

EXAMPLES 1 TO 5 AND COMPARATIVE EXPERIMENTS

The amounts of components (A) and ($b_1+b_2$) stated in the table are melted in an extruder at 260° C., mixed and then granulated. Thereafter, 0.3 part of ultramarine blue, 2 parts of a conventional lubricant based on a phthalate and 0.2 part of a sterically hindered phenol (antioxidant) are added, the amounts in each case being based on 100 parts of granules, and the components are mixed, and compounded under mild conditions.

The blends are converted to test specimens at 250° C. using an injection molding machine, the tests stated in the Table being carried out on the specimens obtained.

TABLE

| Examples/ comparative experiments | Component A Parts | Component B Parts | Composition of B | | | | | Plastechon test |
|---|---|---|---|---|---|---|---|---|
| | | | $b_1$ | $b_2a_1$ | $b_2a_2$ | $b_2a_3$ | ak | |
| Comparative experiment | 60 | 40 | 100 | — | — | — | 20 | 6 |
| Comparative experiment | 60 | 40 | 60 | 20 | 20 | | 25 | 13 |
| 1 | 60 | 40 | 60 | 10 | 20 | 10 | 37 | 15 |
| 2 | 60 | 40 | 60 | 3.3 | 6.7 | 30 | 45 | 19 |
| 3 | 80 | 20 | 60 | 3.3 | 6.7 | 30 | 40 | 25 |
| 4 | 60 | 40 | 50 | 10 | 20 | 20 | 48 | 18 |
| 5 | 80 | 20 | 50 | 10 | 20 | 20 | 53 | 47 |

We claim:

1. A thermoplastic molding composition consisting essentially of
  (A) from 10 to 90 parts by weight of one or more aromatic polycarbonates
and
  (B) from 90 to 10 parts by weight of one or more graft copolymers which are composed of
    ($b_1$) one or more elastomers (rubbers) which account for from 10 to 80% by weight, based on (B) and consist of
      ($b_1a_1$) from 50 to 99.9% by weight, based on ($b_1$), of one or more alkyl acrylates where alkyl is of 1 to 8 carbon atoms,
      ($b_1a_2$) from 0 to 50% by weight, based on ($b_1$), of one or more copolymerizable unsaturated monomers
    and
      ($b_1a_3$) from 0.1 to 5% by weight, based on ($b_1$), of a copolymerizable polyfunctional crosslinking monomer
and
  ($b_2$) a grafted shell on this elastomer, which shell accounts for from 90 to 20% by weight, based on (B), wherein the grafted shell ($b_2$) of the copolymer B is produced in three stages and contains, as copolymerized units,
    ($b_2a_1$) from 5 to 40% by weight, based on ($b_2$), of one or more monoethylenically unsaturated aromatic hydrocarbons of not more than 12 carbon atoms as graft monomers of the first stage,
    ($b_2a_2$) from 15 to 50% by weight, based on ($b_2$), of a mixture of one or more monoethylenically unsaturated aromatic hydrocarbons of not more than 12 carbon atoms with one or more ethylenically unsaturated monomers which are copolymerizable with this, in a weight ratio of from 90:10 to 60:40, as graft monomers of the second stage, and
    ($b_2a_3$) from 10 to 85% by weight, based on ($b_2$), of an alkyl methacrylate or an alkyl acrylate where alkyl is of 1 to 8 carbon atoms, or a mixture of these, as graft monomers of the third stage, the graft copolymer formed the elastomer ($b_1$) and the grafted shell ($b_2$) having a mean particle size of from 200 to 700 nm ($d_{50}$ value of the integral mass distribution).

2. A thermoplastic molding composition consisting essentially of
  (A) from 10 90% by weight of one or more aromatic polycarbonates
and
  (B) from 90 to 10% by weight of one or more graft copolymers
which in turn consist of
  ($b_1$) one or more elastomers (rubbers), which account for from 10 to 80% by weight, based on (B),
and
  ($b_2$) a grafted shell on this elastomer, which accounts for from 90 to 20% by weight, based on (B),
the elastomer ($b_1$) being obtainable by polymerization of a mixture of the monomers ($b_1a_1$), ($b_1a_2$) and ($b_1a_3$) in such a manner that it contains, as copolymerized units (sum of the monomers ($b_1a_1$), ($b_1a_2$) and ($b_1a_3$)=(100),
  ($b_1a_1$) from 50 to 99.9% by weight, based on ($b_1$), of one or more alkyl acrylates where alkyl is of 1 to 8 carbon atoms,
  ($b_1a_2$) from 0 to 50% by weight, based on ($b_1$), of one or more further copolymerizable unsaturated monomers
and
  ($b_1a_3$) from 0.1 to 5% by weight, based on ($b_1$), of a copolymerizable polyfunctional crosslinking monomer, wherein the grafted shell ($b_2$) is obtained by successive polymerization of monomers of the types ($b_2a_1$), ($b_2a_2$) and ($b_2a_3$) in 3 process steps in the stated sequence, in the presence of the elastomer ($b_1$), so that in the first process step, ($b_2a_1$) from 5 to 40% by weight, based on ($b_2$), of one or more ethylenically unsaturated aromatic hydrocarbons carbon of not more than 12 carbon atoms, in the second process step, ($b_2a_2$) from 15 to 50% by weight, based on ($b_2$), of a mixture of one or more monoethylenically unsaturated aromatic hydrocarbons of not more than 12 carbon atoms and one or more copolymerizable ethylenically unsaturated monomers, in a weight ratio of from 90:10 to 60:40, and in the third process step, ($b_2a_3$) from 10 to 85% by weight, based on ($b_2$), of an alkyl methacrylate or of an alkyl acrylate where alkyl is of 1 to 8 carbon atoms, or a mixture of the stated monomers, are grafted on and hence incorporated as copolymerized units, and the graft copolymer formed from the elastomer ($b_1$) and the grafted shell ($b_2$) has a mean particle size of from 200 to 700 nm ($d_{50}$ value of the integral mass distribution).

3. A thermoplastic molding composition consisting essentially of (A) from 10 to 90% by weight of one or more aromatic polycarbonates and (B) from 90 to 10% by weight of one or more graft copolymers which in turn consist of ($b_1$) one or more elastomers (rubbers), which account for from 30 to 70% by weight, based on (B), and ($b_2$) a grafted shell on this elastomer, which accounts for from 70 to 30% by weight, based on (B), the elastomer ($b_1$) being obtainable by polymerization of a mixture of the monomers ($b_1a_1$), ($b_1a_2$) and ($b_1a_3$) in such a manner that it contains, as copolymerized units (sum of the monomers ($b_1a_1$), ($b_1a_2$) and ($b_1a_3$)=(100), ($b_1a_1$) from 50 to 99.9% by weight, based on ($b_1$), of one or more alkyl acrylates where alkyl is of 1 to 8 carbon atoms, ($b_1a_2$) from 0 to 50% by weight, based on ($b_1$), of one or more copolymerizable unsaturated monomers and ($b_1a_3$) from 0.1 to 5% by weight, based on ($b_1$), of a copolymerizable polyfunctional crosslinking monomer, wherein the grafted shell ($b_2$) is obtained by successive polymerization of monomers of the types ($b_2a_1$), ($b_2a_2$) and ($b_2a_3$) in 3 process steps in the stated sequence, in the presence of the elastomer ($b_1$), so that in the first process step ($b_2a_1$) from 10 to 25% by weight, based on ($b_2$), of one or more ethylenically unsaturated aromatic hydrocarbons of not more than 12 carbon atoms, in the second process step, ($b_2a_2$) from 20 to 45% by weight, based on ($b_2$), of a mixture of one or more monethylenically unsaturated aromatic hydrocarbons of not more than 12 carbon atoms and one or more copolymerizable ethylenically unsaturated monomers, in a weight ratio of from 90:10 to 60:40, and in the third process step, ($b_2a_3$) from 25 to 70% by weight, based on ($b_2$), of an alkyl methacrylate or of an alkyl acrylate where alkyl is of 1 to 8 carbon atoms, or a mixture of the stated monomers, are grafted on and hence incorporated as copolymerized units, and the graft copolymer formed from the elastomer ($b_1$) and the grafted shell ($b_2$) has a mean particle size of from 200 to 700 nm ($d_{50}$ value of the integral mass distribution).

4. A composition as set forth in claim 1, wherein the polycarbonates are based on bisphenols.

5. The composition of claim 2, wherein the polycarbonates are based on bisphenols.

6. The composition of claim 3, wherein the polycarbonates are based on bisphenols.

7. The composition of claim 1, wherein the polycarbonates are based on 2,2-bis-(4-hydroxyphenyl)-propane.

8. The composition of claim 2, wherein the polycarbonates are based on 2,2-bis-(4-hydroxyphenyl)-propane.

9. The composition of claim 3, wherein the polycarbonates are based on 2,2-bis-(4-hydroxyphenyl)-propane.

* * * * *